Figure 1:
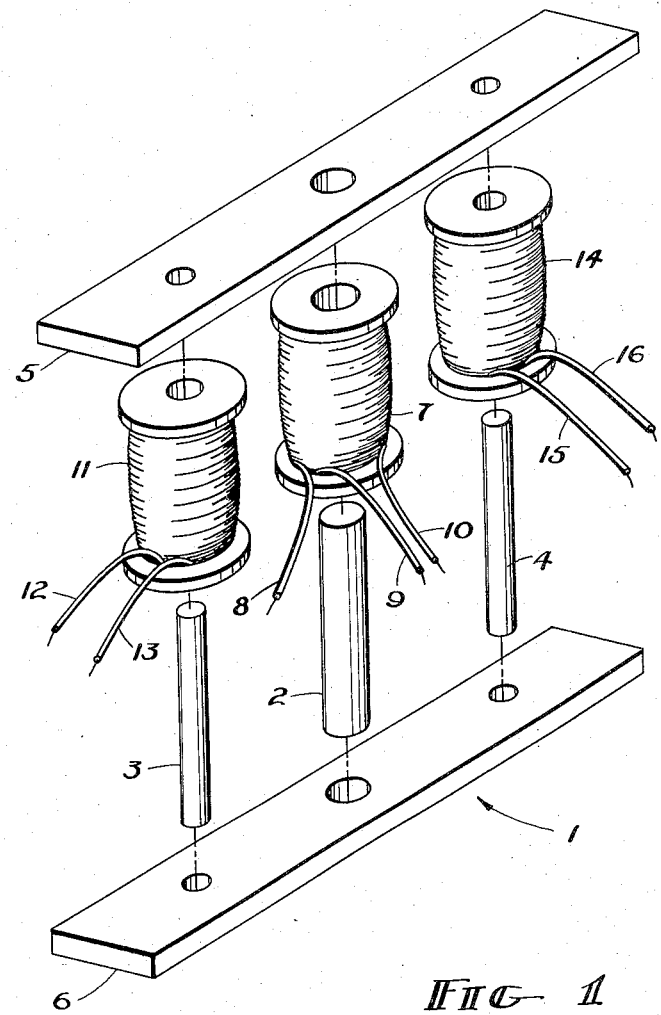

March 3, 1959 G. H. BARRY 2,875,952
MAGNETIC INTEGRATOR

Filed April 23, 1956 3 Sheets-Sheet 1

INVENTOR.
GEORGE H. BARRY
BY *Marin Moody*
ATTORNEYS

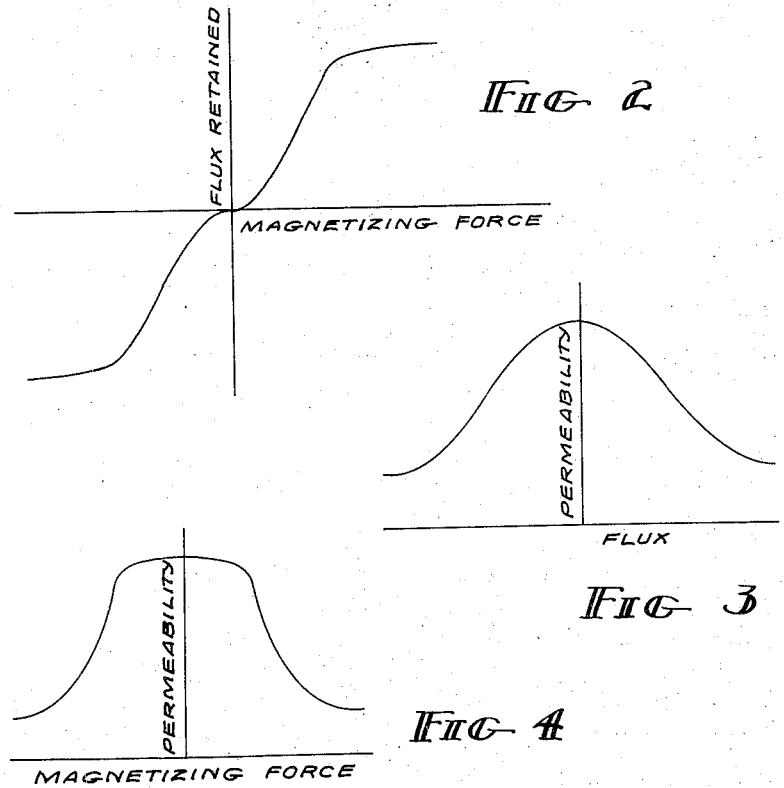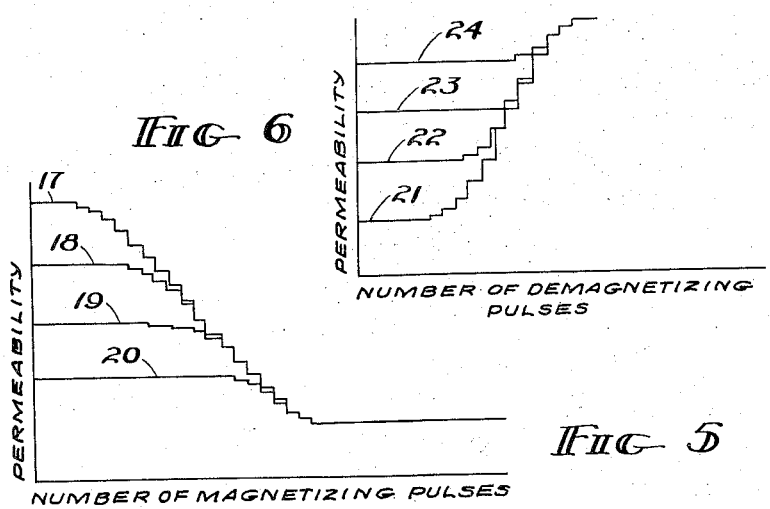

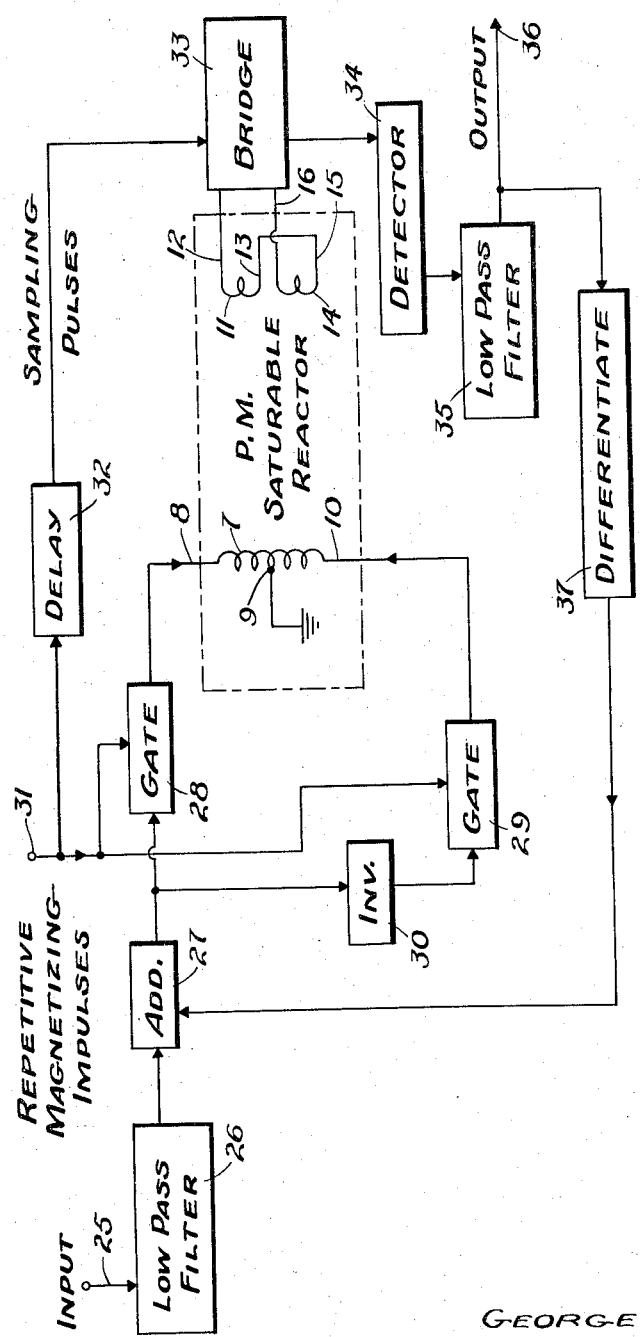

United States Patent Office 2,875,952
Patented Mar. 3, 1959

2,875,952
MAGNETIC INTEGRATOR

George H. Barry, North Hollywood, Calif., assignor to Collins Radio Company, Cedar Rapids, Iowa, a corporation of Iowa Application April 23, 1956, Serial No. 580,103

3 Claims. (Cl. 235—183)

This invention pertains to integrating circuits which may be utilized in computing systems or in servo-control systems and pertains more particularly to magnetic integrators.

Magnetic integrators utilize the retentivity of permanent magnets to perform memory functions. These magnetic integrators may be substituted for mechanical servo arrangements that provide memory through positions of shafts and gear trains.

An object of this invention is to provide magnetic means in which particular degrees of magnetization represents specific values in electrical control systems.

A feature of this invention is the provision for retaining magnetically a particular value for a long period.

The invention is described with reference to the accompanying drawings in which;

Figure 1 shows an exploded view of a permanent magnetic saturable reactor,

Figure 2 is a curve for the magnetic characteristics of the permanent magnet that is a part of the saturable reactor, Figures 3 and 4 are curves for showing how the permeability of the core of the saturable reactor varies with the flux and with magnetizing force, respectively, Figures 5 and 6 are curves illustrating changes in permeability of the core with magnetizing and demagnetizing pulses, respectively, that are applied to the magnetizing winding of the saturable reactor, and;

Figure 7 is a block diagram indicating magnetizing and sampling circuits connected to the saturable reactor.

In general, the magnetic device shown in Figure 1 consists of a centrally located core of retentive magnetic material and its associated energizing windings. The magnetic circuit for the permanent magnet is completed through a highly permeable yoke. Sampling windings disposed on the yoke measure its permeability as a function of the degree of magnetization of the permanent magnet. The circuits represented in Figure 7 provide means for applying magnetizing force to the magnetizing winding of the permanent magnet and for connecting the sampling windings which are connected for measuring the degree of magnetization of the magnet.

More specifically, the saturable reactor 1 of Figure 1 has a three-legged core, a central leg 2 of retentive magnetic material and outside legs 3 and 4 of highly permeable magnetic material. The three legs are joined together by highly permeable magnetic end pieces 5 and 6. On the central leg is disposed a tapped magnetizing winding 7 having end connecting leads 8 and 10 and a tap lead 9. On the outer legs are disposed sampling windings 11 and 14; winding 11 has connecting leads 12 and 13, and winding 14 has connecting leads 15 and 16. As disclosed in the block diagram subsequently the sampling windings are connected in series in a sense that prevents the alternating current which is applied to these windings from changing the state of magnetism of the center leg.

The center leg 2 should be of material that has fairly high retentivity. This material, when magnetized, will then provide adequate flux for saturating the permeable material that completes the magnetic path. Also, with material of high retentivity, exceedingly strong pulses of current will not be required through magnetizing winding 7 in order to change the magnetism retained in magnetic winding 2. The bend in the B–H curve of the material of the center leg should be gradual rather than square in order that there will be progressive flux changes with reversals in magnetizing force. Commercially available magnetic steels having cobalt may be selected to fulfill these requirements. The cores of the end legs and the connecting end pieces should be of highly permeable material that can be readily saturated.

A curve of the flux retained in the center leg of the reactor as a function of the magnetizing force which is applied by the magnetizing winding is shown in Figure 2. For either polarity of the magnet, change in retained flux is comparatively small for changes in magnetizing force when the center leg has little retained flux or when it approaches saturation. For intermediate values of retained flux, changes in magnetizing force produce substantial changes in flux. A curve for the permeability of the outer legs and connecting yokes of the magnetic reactor with respect to flux flow is shown in Figure 3. For low values of flux the change of permeability is comparatively low with respect to flux change. For intermediate values, the change of permeability is substantial for change in flux. In order to exactly reproduce the permeability curve of Figure 3 for a particular magnetic material, the material, must have been subjected to identical magnetic conditions. For example, the curve in Figure 3 may represent permeability when the initial permeability before plotting is zero. If curves are plotted subsequently when the starting permeability is not zero, slightly different curves will be produced. Therefore, an entire family of curves is required in order to fully describe permeability with respect to flux. The curve of Figure 4 is the product of the curve of Figure 2 and the curve of Figure 3. This curve shows how the permeability of the magnetic reactor of Figure 1 varies with respect to the magnetizing force which is applied by the magnetizing winding. The curve being quite flat for low magnetizing forces, shows that change in permeability is small in response to a change in magnetizing force when the amount of retained flux is small. When the retained flux has attained an intermediate value, the change in permeability is substantial for a change in magnetizing force. Again this figure represents permeability for only one initial condition of the magnetic system. As explained with reference to Figure 3, a family of curves is required in order to show the exact permeability of the iron as a function of not only the applied force but also of the previous magnetizing forces.

In the system shown in Figure 7, pulses are integrated for application to the magnetizing winding. Change in permeability for different numbers of magnetizing pulses is shown in Figure 5. Curve 17 of Figure 5 shows that when the amount of retained magnetism in the center leg is low and the permeability of the system is high, a relatively small number of impulses are required to cause a substantial reduction in permeability. When the initial retained magnetism is somewhat higher, a greater number of impulses is initially required in order to cause substantial reduction in permeability as shown by curve 18. Likewise, curves 19 and 20 show that for conditions of still stronger magnetic fields, still greater numbers of impulses are required before there is a substantial reduction in permeability. The curves tend to coincide after sufficient magnetizing pulses have been applied to reduce permeability substantially. When the permeability of the reactor is to be increased, impulses of current are applied to the magnetizing winding in a reverse direction to decrease the retained magnetism in the center leg. Curve 21 of Figure 6 shows a reduction of retained magnetism and increased permeability when the permeability is initially relatively low. Curves 22, 23, and 24 for progressively higher values of initial permeability show that larger numbers of initial demagnetizing pulses are required in order to cause substantial increases in permeability. In order to compensate for the irregular number of impulses initially required for affecting magnetism of the permanent magnet, the output of the magnetic integrating circuit may be applied to a comparator which is connected to the input pulsing circuits. Through this arrangement impulsing may be continued until the output reaches a predetermined level as governed by the input circuit.

The magnetic integrating system shown in Figure 7 consists of two input pulsing circuits 25 and 31 for controlling the permanent magnet saturable reactor 1 and an output circuit for providing an integral of the input 25. The electronic circuits represented by blocks are well known in the fields of electronic controls and electronic computers. The input terminal 25 connects through a low-pass filter 26 and adding network 27 to gate circuit 28 and also connects through phase inverter 30 to gate circuit 29. The adding network 27 is employed to add differentiated voltage from the output circuit to the filtered voltage from the input circuit 25 so as to control the number of the impulses that are to be applied from input circuit 31 to the gate circuits. The arrangement of the inverter circuit with the two gate circuits provides operation of only one gate circuit at a time, the polarity of the controlling impulses at input 25 determining which gate is to be operated. When gate 28 is enabled, impulses from repetitive magnetizing impulsing circuit connected to terminal 31 are applied through conductors 8 to the upper portion of the magnetizing winding 7 of the saturable reactor. The impulsing circuit is completed through tap 9 of the winding to ground. These impulses will change the magnetism retained in the center leg. Providing the impulses add to the magnetic field that is already present, the flux flow in the reactor will be increased and will decrease the permeability of the reactor core. However, when the pulses to input circuit 25 are of proper polarity for enabling gate 29, the impulses from terminal 31 would be applied through gate circuit 29 and conductor 10 to the lower portion of magnetizing winding 7. These impulses will subtract from the retained magnetism produced by application of impulses through gate 28 and cause the permeability of the core to decrease.

The sampling windings 11 and 14, as previously shown in Figure 1, are connected in series by joining conductors 13 and 15; the series connected windings are connected through conductors 12 and 16 to form one leg of a bridge circuit 33. The bridge is adjusted to balance at one extreme end of the range over which the reactor is to be operated. The power for operating the bridge is obtained from the magnetizing pulse source 31 through delay circuit 32. The delay circuit 32 insures that the impulses for operating the bridge are not coincident with the impulses for magnetizing or demagnetizing the permanent magnet. When sufficient numbers of impulses have been applied to the magnetizing winding 7, the permeability of the core is changed and consequently the reactance of the sampling windings 11 and 14 is changed. This change in reactance operates the bridge for applying impulses of voltage to detector 34. The direct current output in detector 34 is filtered by low-pass filter 35 for application to output 36. Also, the output voltage is fed back through differentiating circuit 37 to the adding network 27. This differentiated output voltage is added inversely to the integrated input pulses derived from low-pass filter 26 so that the output voltage change is proportional to the input applied at terminal 25.

The integrating system may be used as an analogue memory by adding the voltage from output 36 to the input voltage present on input terminal 25. Between series of impulses, the retained magnetism will remain practically constant indefinitely so that the stored quantity may be registered by the sampling windings at any time.

The integrating device described herein will maintain information indefinitely. It may be substituted for a mechanical servo in an automatic frequency control system of Radio Teletype equipment. The magnetic memory of this invention when substituted for a mechanical system provides information that was formerly represented by the position of the gears and shafts of the replaced servo.

Although this invention has been described with respect to a particular embodiment thereof, it is not to be so limited as changes and modifications may be made therein which are within the full intended scope of the invention as defined by the appended claims.

What is claimed is:

1. A magnetic integrating system comprising, an integrating saturable magnetic reactor, input electrical impulse control circuits, a detecting circuit for sampling the degree of magnetism of said reactor, a differentiating circuit, said reactor having a magnetizing winding and a sampling winding, said impulse control circuit including an adding circuit, a gate circuit, a first input terminal to which is applied control impulses, and a second input terminal to which is applied repetitive magnetizing impulses, said first input terminal being connected through said adding circuit to said gate circuit, said second input terminal being connected through said gate circuit to said magnetizing winding, said gate circuit operating in response to application of impulses to said first input terminal to conduct impulses from said second input terminal to said magnetizing winding, the polarity of the impulses that are applied to said magnetizing winding being determined by the polarity of the control impulses that are applied to said first input terminal, said detector circuit being connected to said sampling winding, said differentiating circuit being connected between said detector circuit and said adding circuit for adding differentiated impulses from said detector circuit to the impulses that are applied from said first input terminal, and an output terminal connected to said detector.

2. A magnetic integrating system comprising, a first input terminal to which is applied controlling direct-current impulses, a first low-pass filter, an adding network, a first gate circuit connected through said low-pass filter and said adding network to said first input terminal, said first gate circuit being operated by application of impulses of one predetermined polarity to said first input terminal, a second gate circuit, a phase inverter circuit, said second gate circuit being connected through said inverter circuit, said adding circuit, and said low-pass filter to said first input terminal, said second gate circuit being operated by application to said first terminal of impulses with polarity opposite to said one predetermined polarity, a second input terminal to which is applied direct-current magnetizing impulses connected to said first and second gate circuits, a saturable magnetic reactor having a permanent magnet and a saturable core in a magnetic circuit, a magnetizing winding disposed on said permanent magnet, output circuits of said first and second gate circuits being connected to said magnetizing winding so that operation of either one of said gate circuits applies impulses from said second input terminal to said winding, said first and said second gate circuits operating to produce flux of opposite polarities in said permanent magnet, a sampling winding disposed on said saturable core, a bridge circuit including said sampling winding, a detector circuit and a second low-pass filter connected in cascade with said bridge circuit, an output terminal connected to said second low-pass filter circuit, and a differentiating circuit connected between said output terminal and said adding circuit.

3. An integrating system as claimed in claim 2 wherein an impulsing delay circuit is connected between said second input terminal and said bridge.

References Cited in the file of this patent

UNITED STATES PATENTS 2,430,457   Dimond _____ Nov. 11, 1947